(12) United States Patent
Sun et al.

(10) Patent No.: US 12,710,337 B2
(45) **Date of Patent: *Aug. 18, 2026**

(54) ILLUMINATION SYSTEM FOR AR METROLOGY TOOL

(71) Applicant: Applied Materials, Inc., Santa Clara, CA (US)

(72) Inventors: Yangyang Sun, San Jose, CA (US); Jinxin Fu, Fremont, CA (US); Kazuya Daito, Milpitas, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,513

(22) Filed: May 17, 2024

(65) Prior Publication Data

US 2024/0385075 A1 Nov. 21, 2024

Related U.S. Application Data

(63) Continuation of application No. 17/456,240, filed on Nov. 23, 2021, now Pat. No. 11,988,574.

(Continued)

(51) Int. Cl.

*G01M 11/02* (2006.01)
*G02B 19/00* (2006.01)

(Continued)

(52) U.S. Cl.

CPC ..... *G01M 11/0264* (2013.01); *G02B 19/0047* (2013.01); *G02B 27/30* (2013.01);

(Continued)

(58) Field of Classification Search

CPC .......... G01M 11/0264; G02B 19/0047; G02B 27/30; G02B 27/0081; G02B 27/62;

(Continued)

(56) References Cited

U.S. PATENT DOCUMENTS 7,457,040 B2 11/2008 Amitai
7,573,019 B2 8/2009 Koyama (Continued)

FOREIGN PATENT DOCUMENTS

CN 111033326 A 4/2020
JP H09068705 A 3/1997

(Continued)

OTHER PUBLICATIONS

Extended European Search Report for European Application 21899034.9 dated Sep. 17, 2024.

(Continued)

*Primary Examiner* — Nasim N Nirjhar

(74) *Attorney, Agent, or Firm* — Patterson + Sheridan, LLP

(57) ABSTRACT

Embodiments described herein provide for light engines of a measurement system and methods of using the light engines. The measurement system includes a light engine operable to illuminate a first grating of an optical device. The light engine projects a pattern with a light from a light engine. The light engine projects a pattern to the first grating such that a metrology metric may be extracted from one or more images captured by a detector of the measurement system. The metrology metrics are extracted by processing the image. The metrology metrics determine if the optical device meets image quality standards.

19 Claims, 6 Drawing Sheets

Related U.S. Application Data

(60) Provisional application No. 63/184,398, filed on May 5, 2021, provisional application No. 63/117,576, filed on Nov. 24, 2020.

(51) Int. Cl.
*G02B 27/30* (2006.01)
*G06T 7/00* (2017.01)
*H04N 23/56* (2023.01)

(52) U.S. Cl.
CPC .......... *G06T 7/0002* (2013.01); *H04N 23/56* (2023.01); *G06T 2207/10152* (2013.01); *G06T 2207/30168* (2013.01); *G06T 2207/30204* (2013.01)

(58) Field of Classification Search
CPC .......... G02B 27/0172; G02B 2027/011; G06T 7/0002; G06T 2207/10152; G06T 2207/30168; G06T 2207/30204; H04N 23/56
See application file for complete search history.

(56) References Cited

U.S. PATENT DOCUMENTS

| | | | |
|---|---|---|---|
| 7,576,916 | B2 | 8/2009 | Amitai |
| 7,710,655 | B2 | 5/2010 | Freeman et al. |
| 7,724,441 | B2 | 5/2010 | Amitai |
| 7,736,006 | B2 | 6/2010 | Freeman et al. |
| 7,905,603 | B2 | 3/2011 | Freeman et al. |
| 7,959,308 | B2 | 6/2011 | Freeman et al. |
| 8,004,765 | B2 | 8/2011 | Amitai |
| 9,189,705 | B2 | 11/2015 | Jeong |
| 9,671,603 | B2 | 6/2017 | Kalkbrenner et al. |
| 9,720,236 | B2 | 8/2017 | Yokoyama |
| 9,752,932 | B2 | 9/2017 | Fontecchio et al. |
| 11,022,798 | B2 | 6/2021 | Yeoh et al. |
| 11,073,693 | B2 | 7/2021 | Akutsu et al. |
| 11,131,629 | B2 | 9/2021 | Sezginer et al. |
| 11,656,390 | B2 | 5/2023 | Park et al. |
| 11,852,841 | B2 | 12/2023 | Yeoh et al. |
| 12,092,836 | B2 | 9/2024 | Sales |
| 2003/0048436 | A1 | 3/2003 | Kitabayashi et al. |
| 2005/0057495 | A1 | 3/2005 | Parker et al. |
| 2005/0180687 | A1 | 8/2005 | Amitai |
| 2006/0109482 | A1 | 5/2006 | Duval et al. |
| 2007/0159673 | A1 | 7/2007 | Freeman et al. |
| 2007/0171328 | A1 | 7/2007 | Freeman et al. |
| 2007/0171329 | A1 | 7/2007 | Freeman et al. |
| 2008/0158685 | A1 | 7/2008 | Amitai |
| 2008/0239290 | A1 | 10/2008 | Watanabe et al. |
| 2009/0052046 | A1 | 2/2009 | Amitai |
| 2009/0097127 | A1 | 4/2009 | Amitai |
| 2010/0056928 | A1* | 3/2010 | Zuzak .................. G01J 3/2823 356/302 |
| 2010/0201953 | A1 | 8/2010 | Freeman et al. |
| 2010/0202034 | A1 | 8/2010 | Freeman et al. |
| 2012/0015460 | A1 | 1/2012 | Donaher |
| 2014/0146166 | A1 | 5/2014 | Shin |
| 2015/0043803 | A1 | 2/2015 | Jeong |
| 2015/0260994 | A1 | 9/2015 | Akutsu et al. |
| 2015/0301325 | A1* | 10/2015 | Kalkbrenner ...... G02B 21/0092 359/385 |
| 2016/0124229 | A1 | 5/2016 | Yokoyama |
| 2018/0012914 | A1 | 1/2018 | Seo et al. |
| 2018/0275390 | A1 | 9/2018 | Harsila |
| 2018/0340886 | A1 | 11/2018 | Sezginer et al. |
| 2018/0364487 | A1 | 12/2018 | Yeoh et al. |
| 2019/0121027 | A1 | 4/2019 | Popovich et al. |
| 2020/0133012 | A1 | 4/2020 | Sales |
| 2020/0141802 | A1 | 5/2020 | Fu et al. |
| 2020/0209104 | A1* | 7/2020 | Sogard .................. G01M 11/02 |
| 2020/0249589 | A1* | 8/2020 | Maeda .................. G03F 9/7046 |
| 2020/0264522 | A1 | 8/2020 | De Winter et al. |
| 2020/0271836 | A1 | 8/2020 | Park |
| 2020/0333534 | A1 | 10/2020 | Cotton |
| 2021/0063900 | A1 | 3/2021 | Ni et al. |
| 2021/0185632 | A1 | 6/2021 | Manolakos et al. |
| 2021/0333555 | A1 | 10/2021 | Yeoh et al. |
| 2022/0335649 | A1 | 10/2022 | Nayak et al. |
| 2024/0077741 | A1 | 3/2024 | Yeoh et al. |
| 2025/0004286 | A1 | 1/2025 | Sales |

FOREIGN PATENT DOCUMENTS

| | | | |
|---|---|---|---|
| JP | H11133309 | A | 5/1999 |
| JP | 2001274941 | A | 10/2001 |
| JP | 2003274087 | A | 9/2003 |
| JP | 2005256671 | A | 9/2005 |
| JP | 2008298932 | A | 12/2008 |
| JP | 2009516862 | A | 4/2009 |
| JP | 2010164988 | A | 7/2010 |
| JP | 2015175967 | A | 10/2015 |
| JP | 2015529347 | A | 10/2015 |
| JP | 2016085426 | A | 5/2016 |
| JP | 2020067664 | A | 4/2020 |
| KR | 2007-0026797 | A | 3/2007 |
| TW | 200510690 | A | 3/2005 |
| TW | 201514468 | A | 4/2015 |
| TW | I525315 | B | 3/2016 |
| TW | 201907228 | A | 2/2019 |
| WO | 03081320 | A1 | 10/2003 |
| WO | 2005124831 | A1 | 12/2005 |
| WO | 2007062098 | A2 | 5/2007 |
| WO | 2012009197 | A2 | 1/2012 |
| WO | 2014040799 | A1 | 3/2014 |
| WO | 2018/236725 | A1 | 12/2018 |

OTHER PUBLICATIONS

Moderator (Intel Corporation), "Summary of the RAN1 Wg e-mail discussion [100b-e-NR-Pos-01]", vol. RAN WG1, No. e-Meeting; Apr. 20, 2020-Apr. 30, 2020, May 1, 2020; Retrieved from the Internet: URL:https://ftp.3gpp.org/ tsg_ran/WG1_RL1/TSGR1_100b_e/Docs/R1-2002770.zip R1-2002770_[100b-e-NR-Pos-01].docx.

"3 Generation Partnership Project; Technical Specification Group Radio Access Network; LTE Positioning Protocol (LPP) (Release 16)", No. V16.1.0, Jul. 24, 2020 (Jul. 24, 2020), p. 1-292; Retrieved from the Internet: URL:ftp://ftp.3gpp.org/Specs/archive/37_series/37.355/37355-g10.zip 37355-g10.docx.

Intel Corporation, "Output of email thread [100e-NR-Pos-DL-PRS-02]", vol. RAN WG1, No. e-Meeting; Feb. 24, 2020-Mar. 6, 2020, Mar. 5, 2020; Retrieved from the Internet: URL:https://ftp.3gpp.org/tsg_ran/WG1_RL1/ TSGR1_100_e/Docs/R1-2001235.zip R1-2001235.docx.

ZTE, "Discussions on potential NR positioning enhancements", vol. RAN WG1, No. e-Meeting; Aug. 17, 2020-Aug. 28, 2020, Aug. 8, 2020; Retrieved from the Internet: URL:https://ftp.3gpp.org/tsg_ran/WG1_RL1/TSGR1_102-e/Docs/R1-2005464.zip R1-2005464 Discussion on potential NR positioning enhancements.docx.

Qualcomm Incorporated, "Initial thoughts on Potential Positioning Enhancements", vol. RAN WG1, No. e-meeting; May 25, 2020-Jun. 5, 2020, May 16, 2020; Retrieved from the Internet: URL:https://ftp.3gpp.org/tsg_ran/WG1_RL1/TSGR1_101-e/Docs/R1-2004492.zip R1-2004492.docx.

Moderator (Catt), "FL Summary #2 for Potential Positioning Enhancements", vol. RAN WG1, No. e-meeting; May 25, 2020-Jun. 5, 2020, Aug. 22, 2020; Retrieved from the Internet: URL:https://ftp.3gpp.org/tsg_ran/WG1_RL1/ TSGR1_102-e/Docs/R1-2007111.zip R1-2007111 FL Summary #2 for NR PosEnh.docx.

PCT Notification of Transmittal of the International Search Report and the Written Opinion of the International Searching Authority for International Application No. PCT/US2021/060576; dated Mar. 21, 2022.

Office Action for U.S. Appl. No. 17/456,240 dated Jan. 25, 2023.

Final Office Action for U.S. Appl. No. 17/456,240 dated Aug. 18, 2023.

(56) References Cited

OTHER PUBLICATIONS

Office Action for Taiwan Application No. 110143675 dated Nov. 26, 2025.
Search Report for Taiwan Application No. 110143675 dated Nov. 24, 2025.
Decision to Grant a Patent for Japanese Application No. 2023-530644 dated Nov. 4, 2025.
Korean Office Action for Application No. 10-2023-7020978 dated Mar. 26, 2026.
Chinese Office Action for Application No. 202180082825.0 dated Apr. 16, 2026.
European Office Action for Application No. 21899034.9 dated Apr. 9, 2026.

* cited by examiner

ILLUMINATION SYSTEM FOR AR METROLOGY TOOL

CROSS-REFERENCE TO RELATED APPLICATIONS

This application is a continuation of U.S. patent application Ser. No. 17/456,240, filed Nov. 23, 2021, which claims the benefit of U.S. Provisional Patent Application Ser. No. 63/184,398, filed May 5, 2021 and U.S. Provisional Patent Application Ser. No. 63/117,576, filed Nov. 24, 2020, all of which are hereby incorporated by reference in their entirety.

BACKGROUND

Field

Embodiments of the present disclosure generally relate to optical devices for augmented, virtual, and mixed reality. More specifically, embodiments described herein provide for light engines of a measurement system and methods of using the light engines.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is measuring optical devices for image quality standards. To ensure that image quality standards are met, metrology metrics of the fabricated optical devices must be obtained. However, existing measurement systems lack a desired field of view and suffer from ghost imaging. Accordingly, what is needed in the art is a measurement system and methods of using the measurement system with an improved field of view and a decreased occurrence of ghost imaging.

SUMMARY

In one embodiment, a measurement system is provided. The measurement system includes a stage operable to retain an optical device or an optical device substrate having at least one optical device disposed thereon. The measurement system further includes a light engine disposed above the stage. The light engine includes a plurality of light sources. The plurality of light sources are operable to project a light to the optical device at a range of wavelengths. The light engine further includes a first lens operable to collimate the light from each of the plurality of light sources. The light engine further includes a reticle tray disposed below the plurality of light sources. The reticle tray has a plurality of reticles disposed thereon. Each reticle of the plurality of reticles has a pattern to be projected when the light is directed to each reticle of the plurality of reticles. The light engine further includes a second lens operable to receive the pattern projected from each of the plurality of reticles. The second lens is operable to project the pattern to an input coupling grating of the optical device.

In another embodiment, a measurement system is provided. The measurement system includes a stage operable to retain an optical device or an optical device substrate having at least one optical device disposed thereon. The measurement system further includes a light engine disposed above the stage. The light engine includes a module operable to project one or more patterns to the optical device. The light engine is operable to rotate and/or tilt to adjust an incidence angle of the pattern projected to the optical device or the optical device substrate. The measurement system further includes an alignment camera adjacent to the light engine. The alignment camera is positioned to capture one or more images of one or more alignment markers on the optical device or the optical device substrate. The measurement system further includes a reflection detector adjacent to the light engine. The reflection detector is positioned to detect outcoupled beams projected from the optical devices.

In yet another embodiment, a method is provided. The method includes projecting a pattern. The pattern is projected with a light from a light engine. The light engine is disposed in a measurement system. The measurement system includes a stage disposed under the light engine. The measurement system further includes a tray disposed on the stage. The tray includes an optical device or an optical device substrate having at least one optical device disposed thereon and the optical device is operable to receive the pattern. The measurement system further includes a reflection detector oriented toward the stage. The method further includes detecting one or more images of the pattern. The image is detected when the pattern undergoing total internal reflection through the optical device is outcoupled to the reflection detector. The method further includes processing the image to extract metrology metrics.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices for augmented, virtual, and mixed reality. More specifically, embodiments described herein provide for light engines of a measurement system and methods of using the light engines. The measurement system includes a stage operable to retain an optical device or an optical device substrate having at least one optical device disposed thereon. The measurement system further includes a light engine disposed above the stage. The light engine includes a plurality of light sources. The plurality of light sources are operable to project a light to the optical device at a range of wavelengths. The light engine further includes a first lens operable to collimate the light from each of the plurality of light sources. The light engine further includes a reticle tray disposed below the plurality of light sources. The reticle tray has a plurality of reticles disposed thereon. Each reticle of the plurality of reticles has a pattern to be projected when the light is directed to each reticle of the plurality of reticles. The light engine further includes a second lens operable to receive the pattern projected from each of the plurality of reticles. The second lens is operable to project the pattern to an input coupling grating of the optical device. The light engine may also include a module to project a pattern.

The method of using the light engine includes projecting a pattern with a light from a light engine. The method further includes detecting one or more images of the pattern. The image is detected when the pattern undergoing total internal reflection through the optical device is outcoupled to a reflection detector. The method further includes processing the image to extract metrology metrics.

Figure 1A:
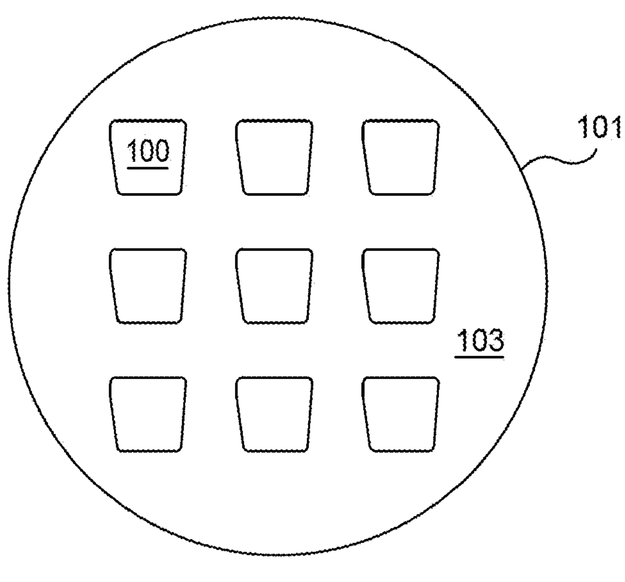
FIG. 1A is a perspective, frontal view of a substrate according to embodiments described herein.

FIG. 1A is a perspective, frontal view of a substrate 101 according to embodiments described herein. The substrate includes a plurality of optical devices 100 disposed on a surface 103 of the substrate 101. In some embodiments, which can be combined with other embodiments described herein, the optical devices 100 are waveguide combiners utilized for virtual, augmented, or mixed reality. In some embodiments, which can be combined with other embodiments described herein, the optical devices 100 are flat optical devices, such as metasurfaces.

The substrate 101 can be any substrate used in the art, and can be either opaque or transparent to a chosen laser wavelength depending on the use of the substrate 101. The substrate 101 includes, but is not limited to, silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), silicon nitride (SiN), or sapphire containing materials. Additionally, the substrate 101 may have varying shapes, thicknesses, and diameters. For example, the substrate 101 may have a diameter of about 150 mm to about 300 mm. The substrate 101 may have a circular, rectangular, or square shape. The substrate 101 may have a thickness of between about 300 μm to about 1 mm. Although only nine optical devices 100 are shown on the substrate 101, any number of optical devices 100 may be disposed on the surface 103 of the substrate 101.

Figure 1B:
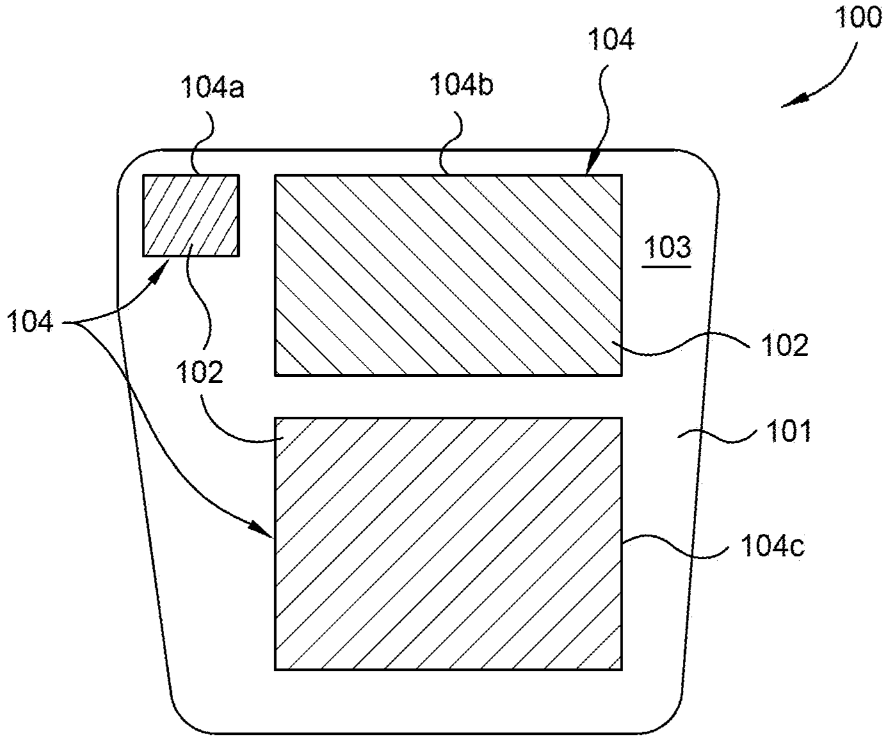
FIG. 1B is a perspective, frontal view of an optical device according to embodiments described herein.

FIG. 1B is a perspective, frontal view of an optical device 100. It is to be understood that the optical devices 100 described herein are exemplary optical devices and the other optical devices may be used with or modified to accomplish aspects of the present disclosure. The optical device 100 includes a plurality of optical device structures 102 disposed on a surface 103 of a substrate 101. The optical device structures 102 may be nanostructures having sub-micron dimensions, e.g., nano-sized dimensions. Regions of the optical device structures 102 correspond to one or more gratings 104, such as a first grating 104*a*, a second grating 104*b*, and a third grating 104*c*. In one embodiment, which can be combined with other embodiments described herein, the optical device 100 includes at least the first grating 104*a* corresponding to an input coupling grating and the third grating 104*c* corresponding to an output coupling grating. In another embodiment, which can be combined with other embodiments described herein, the optical device 100 also includes the second grating 104*b* corresponding to an intermediate grating. The optical device structures 102 may be angled or binary. The optical device structures 102 may have other cross-sections including, but not limited to, circular, triangular, elliptical, regular polygonal, irregular polygonal, and/or irregular shaped cross-sections.

In operation, the first grating 104*a* receives incident beams of light having an intensity from a light engine. In one embodiment, which can be combined with other embodiments described herein, the light engine is a microdisplay. The incident beams are split by the optical device structures 102 into T1 beams that have all of the intensity of the incident beams in order to direct a virtual image to the intermediate grating (if utilized) or to the third grating 104*c*. In one embodiment, which can be combined with other embodiments described herein, the T1 beams undergo total-internal-reflection (TIR) through the optical device 100 until the T1 beams come in contact with the optical device structures 102 of the intermediate grating. The optical device structures 102 of the intermediate grating diffract the T1 beams to T−1 beams that undergo TIR through the optical device 100 to the optical device structures 102 of the third grating 104*c*. The optical device structures 102 of the third grating 104*c* outcouple the T−1 beams to the user's eye. The T−1 beams outcoupled to the user's eye display the virtual image produced from the light engine from the user's perspective and further increase the viewing angle from which the user can view the virtual image. In another embodiment, which can be combined with other embodiments described herein, the T1 beams undergo total-internal-reflection (TIR) through the optical device 100 until the T1 beams come in contact with the optical device structures 102 of the third grating 104*c* and are outcoupled to display the virtual image produced from the light engine.

To ensure that the optical devices 100 meet image quality standards, metrology metrics of the fabricated optical devices 100 must be obtained. The metrology metrics of each optical device 100 are tested to ensure that pre-determined values are achieved. Embodiments of the measurement system 200 described herein provide for the ability to obtain multiple metrology metrics with increased throughput. The metrology metrics include one or more of an angular uniformity metric, a contrast metric, a efficiency metric, a color uniformity metric, a modulation transfer function (MTF) metric, a field of view (FOV) metric, a ghost image metric, and an eye box metric.

Figure 2:
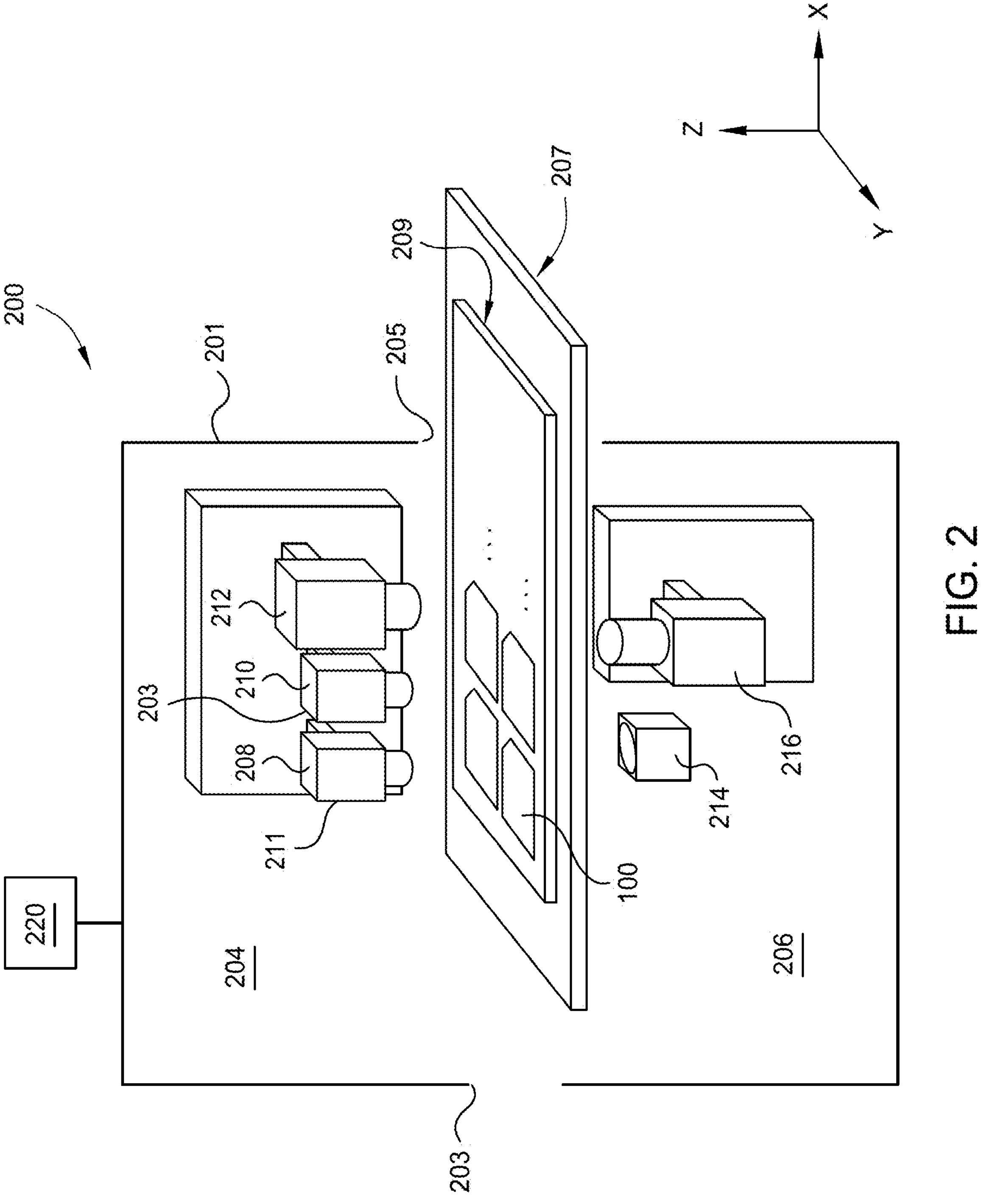
FIG. 2 is a schematic, cross-sectional view of a measurement system according to embodiments described herein.

FIG. 2 is a schematic, cross-sectional view of a measurement system 200 according to embodiments described herein. The measurement system 200 includes a body 201 with a first opening 203 and a second opening 205 to allow a stage 207 to move therethrough. The stage 207 is operable to move in an X-direction, a Y-direction, and a Z-direction in the body 201 of the measurement system 200. The stage 207 includes a tray 209 operable to retain the optical devices 100 (as shown herein) or one or more substrates 101 with the optical devices 100 disposed thereon.

The measurement system 200 is operable to obtain one or more metrology metrics including one or more of the angular uniformity metric, the contrast metric, the efficiency metric, the color uniformity metric, the MTF metric, the FOV metric, the ghost image metric, or the eye box metric. The stage 207 and the tray 209 may be transparent such that the metrology metrics obtained by the measurement system 200 are not impacted by the translucence of the stage 207 or the tray 209. The measurement system 200 is in communication with a controller 220. The controller 220 is operable to facilitate operation of the measurement system 200.

The measurement system 200 includes an upper portion 204 oriented toward a top side 222 of the optical devices 100 and a lower portion 206 oriented toward a bottom side 224 of the optical device 100. The upper portion 204 of the measurement system 200 includes an alignment camera 208, a light engine 210, and a reflection detector 212. The alignment camera 208 is operable to determine a position of the stage 207. The alignment camera 208 is also operable to determine a position of the optical devices 100 disposed on the stage 207. The alignment camera 208 includes an alignment camera body 211. The light engine 210 is operable to project light. For example, the light engine 210 is operable to illuminate a first grating 104*a* of the optical devices 100. The light engine 210 includes a light engine body 213. In one embodiment, which can be combined with other embodiments described herein, the light engine 210 projects a pattern to the first grating 104*a*. The reflection detector 212 detects outcoupled beams projected from a third grating 104*c* of the optical devices 100. The outcoupled beams may be emitted from the top side 222 or the bottom side 224 of the optical devices 100. The outcoupled beams may correspond to the pattern from the light engine 210. One or more images of the pattern are detected by the reflection detector 212. The one or more images of the pattern may be processed with the controller 220 to extract each metrology metric.

The lower portion 206 of the measurement system 200 includes a code reader 214 and a transmission detector 216. The code reader 214 and the transmission detector are positioned opposite the alignment camera 208, the light engine 210, and the reflection detector 212 on the other side of the stage 207. The code reader 214 is operable to read a code of the optical devices 100, such as a quick response (QR) code or barcode of an optical device 100. The code read by the code reader 214 may include identification information and/or instructions for obtaining the one or more metrology metrics of the optical devices 100. The transmission detector 216 detects outcoupled beams projected from the third grating 104*c* though the bottom side 224 of the optical devices 100. In one embodiment, which can be combined with other embodiments described herein, the transmission detector 216 is coupled to a transmission detector stage 226. The transmission detector stage 226 is operable to move the transmission detector 216 in an X-direction, a Y-direction, and a Z-direction. The transmission detector stage 226 is operable to adjust the position of the transmission detector 216 to enhance the detection of the outcoupled beams projected from the third grating 104*c*

In operation, the metrology metrics are obtained by illuminating the first grating 104*a* of an optical device 100 with the light engine 210. The light engine 210 projects a pattern to the one or more optical devices 100. The incoupled light undergoes TIR until the light is outcoupled (e.g., reflected or transmitted) out of the optical device 100. The pattern is captured by the reflection detector 212 as one or more images. The one or more images may correspond to red, green, and blue channels. The one or more images may also correspond to one or more different metrology metrics. The one or more images are full-field images.

Figure 3A:
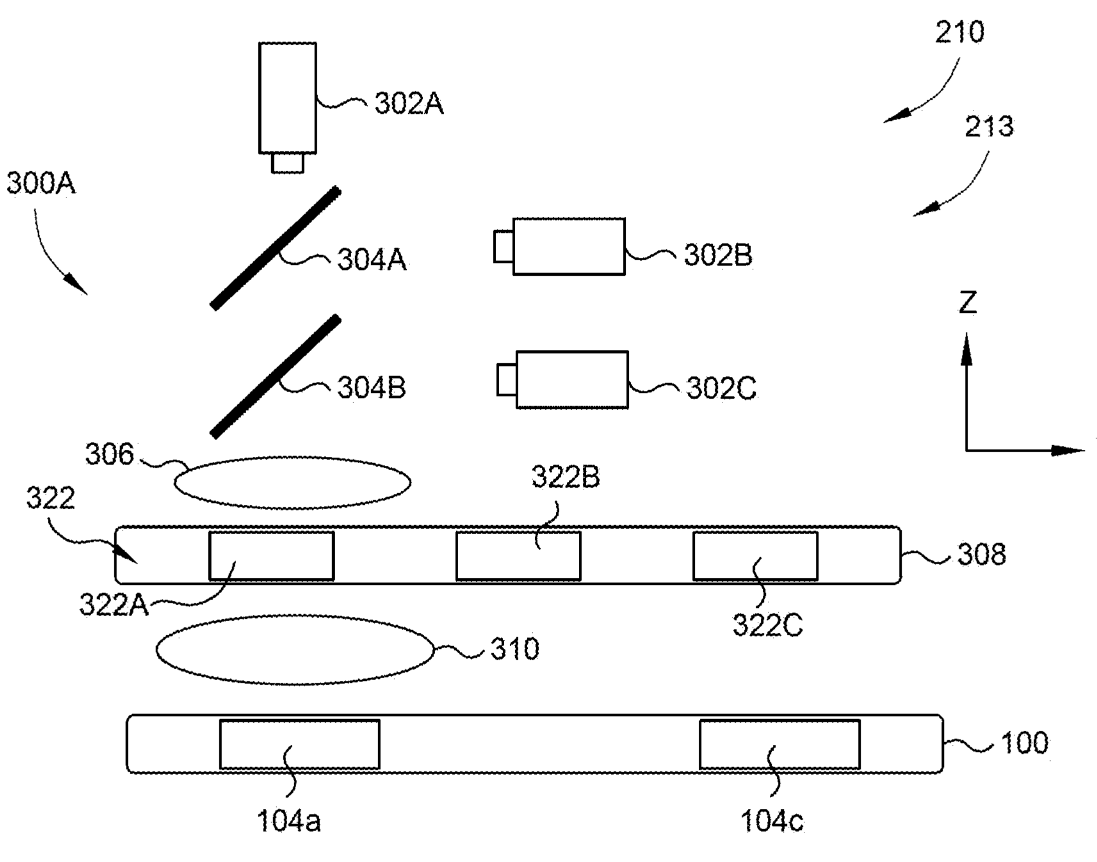
FIGS. 3A-3E are schematic views of configurations of a light engine of a measurement system according to embodiments described herein.

FIG. 3A is a schematic view of a first configuration 300A of a light engine 210 of a measurement system 200 according to embodiments described herein. The first configuration 300A includes a first light source 302A, a second light source 302B, a third light source 302C, a first mirror 304A, a second mirror 304B, a first lens 306, a reticle tray 308, and a second lens 310. The first light source 302A, the second light source 302B, the third light source 302C, the first mirror 304A, the second mirror 304B, the first lens 306, the reticle tray 308, and the second lens 310 are disposed in a light engine body 213.

The first light source 302A is operable to project a first light corresponding to a first wavelength or a first range of wavelengths. In one embodiment, which can be combined with other embodiments described herein, the first light source 302A is a light-emitting diode (LED). In another embodiment, which can be combined with other embodiments described herein, the first wavelength or the first range of wavelengths is 620 nm to 750 nm corresponding to red light. The first light is directed to the first lens 306.

The second light source 302B is operable to project a second light corresponding to a second wavelength or a second range of wavelengths. In one embodiment, which can be combined with other embodiments described herein, the second light source 302B is a LED. In another embodiment, which can be combined with other embodiments described herein, the second wavelength or the second range of wavelengths is 495 nm to 570 nm corresponding to green light. The second light source 302B projects the second light to the first mirror 304A. The first mirror 304A is operable to direct the second light toward the first lens 306.

The third light source 302C is operable to project a third light corresponding to a third wavelength or a third range of wavelengths. In one embodiment, which can be combined with other embodiments described herein, the third light source 302C is a LED. In another embodiment, which can be combined with other embodiments described herein, the third wavelength or the third range of wavelengths is 450 nm to 495 nm corresponding to blue light. The third light source 302C projects the third light to the second mirror 304B. The second mirror 304B is operable to direct the third light toward the first lens 306.

The first light source 302A, the second light source 302B, and the third light source 302C are not limited to the orientations and positions shown in FIG. 3A. For example, the first light source 302A may be configured to project the first light to first mirror 304A or to the second mirror 304B. In one embodiment, which can be combined with other embodiments described herein, the first light source 302A, the second light source 302B, and the third light source 302C are point sources or extended sources. The first mirror 304A and the second mirror 304B are operable to reflect any range of wavelengths projected toward the first mirror 304A and the second mirror 304B. The first mirror 304A and the second mirror 304B may be dichroic mirrors.

The first light, the second light, and the third light are directed to the first lens 306. In one embodiment, which can be combined with other embodiments described herein, the first lens 306 is a collimation lens. The first lens 306 is operable to collimate the light, such as the first light, the second light, or the third light, when passing through the first lens 306. The first lens 306 collimates the light such that the light has a light diameter of about 10 mm to about 50 mm. The light diameter corresponds to a field of view of the measurement system 200. In some embodiments, which can be combined with other embodiments described herein, the light sources 302A, 302B and 302C are extended light sources positioned to direct light to the first lens 306 to reduce the spatial coherence of the illumination. In some embodiments, which can be combined with other embodiments described herein, the first lens 306 is removed from the light engine 210 to improve throughput.

The reticle tray 308 includes reticles 322 (i.e., a first reticle 322A, a second reticle 322B, and a third reticle 322C). The first lens 306 collimates the light toward the reticles 322 on the reticle tray 308. Each of the first reticle 322A, the second reticle 322B, and the third reticle 322C may include a pattern to be projected to a first grating 104*a* of the optical device 100. Each of the first reticle 322A, the second reticle 322B, and the third reticle 322C may include different patterns. The pattern is projected when one of the first light source 302A, the second light source 302B, and the third light source 302C project light to the reticles 322 such that the reticles 322 are illuminated. The pattern then illuminates the first grating 104*a*. The first grating 104*a* corresponds to an input coupling grating of the optical device 100. The reticle tray 308 is operable to move in one or more of a X-direction, a Y-direction, and a Z-direction. Therefore, the reticle tray 308 may be adjusted such that light is projected though one of the first reticle 322A, the second reticle 322B, and the third reticle 322C during operations of the methods described herein. The reticle tray 308 is adjusted in the Z-direction to improve the quality of the pattern to be projected. For example, adjusting the reticle tray 308 in the Z-direction may change the angle and intensity of the light incident on the reticles 322.

Each of the patterns of the first reticle 322A, the second reticle 322B, and the third reticle 322C may correspond to a different metrology metric to be determined by the measurement system 200. For example, each respective pattern of the reticles 322 may allow for a respective metrology metric to be determined. In some embodiments, which can be combined with other embodiments described herein, the metrology metrics may correspond to the same pattern. In other embodiments, which can be combined with other embodiments described herein, the metrology metrics may require more than one pattern to be extracted. Additionally, each of the patterns of the first reticle 322A, the second reticle 322B, and the third reticle 322C may correspond to multiple metrology metrics. Thus, multiple reticles 322 are needed to obtain different metrology metrics for the optical device 100. The reticle tray 308 is not limited to three reticles 322. The reticle tray 308 is operable to retain more or less than three reticles 322. For example, there may be an array of the reticles 322 disposed on the reticle tray 308.

The first light, the second light, and the third light are directed from the reticles 322 to the second lens 310. In one embodiment, which can be combined with other embodiments described herein, the second lens 310 is an eyepiece lens. The second lens 310 is operable to direct the pattern from the reticles 322 to the first grating 104*a*. The second lens 310 converts the pattern such that the first grating 104*a* can receive the pattern. The pattern projected from the reticles 322 undergoes TIR until it is outcoupled from the third grating 104*c*. The third grating 104*c* corresponds to an output coupling grating.

Figure 3B:
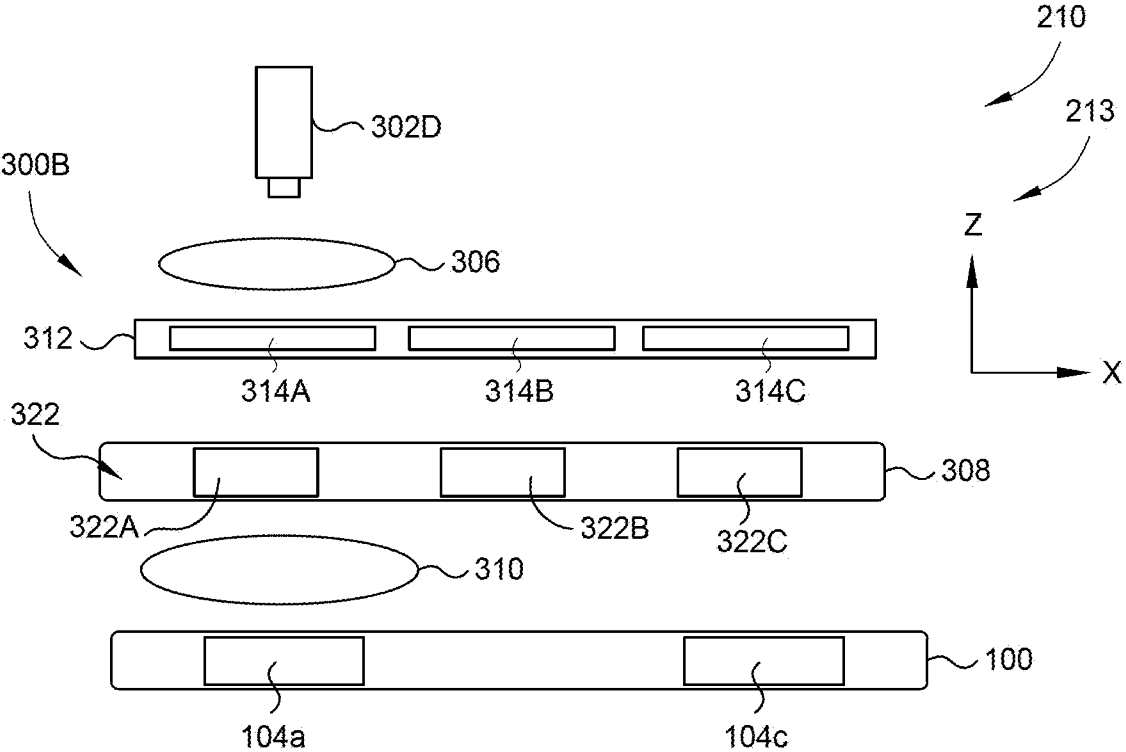

FIG. 3B is a schematic view of a second configuration 300B of a light engine 210 of a measurement system 200 according to embodiments described herein. The second configuration 300B includes a white light source 302D, the first lens 306, a color filter tray 312, the reticle tray 308, and the second lens 310. The white light source 302D, the first lens 306, the color filter tray 312, the reticle tray 308, and the second lens 310 are disposed in a light engine body 213.

The white light source 302D is operable to project a white light corresponding to a range of wavelengths. In one embodiment, which can be combined with other embodiments described herein, the white light source 302D is a LED. In another embodiment, which can be combined with other embodiments described herein, the range of wavelengths is 390 nm to 750 nm corresponding to white light. The color filter tray 312 includes a first color filter 314A, a second color filter 314B, and a third color filter 314C. The first color filter 314A is operable to allow the white light to be filtered such that a first wavelength or a first range of wavelengths of a first light to be projected to the optical device 100 is projected to the optical device 100. The second color filter 314B is operable to allow the white light to be filtered such that a second wavelength or a second range of wavelengths of a second light is projected to the optical device 100. The third color filter 314C is operable to allow the white light to be filtered such that a third wavelength or a third range of wavelengths of a third light is projected to the optical device 100. The color filter tray 312 is operable to move in one or more of a X-direction, a Y-direction, and a Z-direction such that light is projected though one of the first color filter 314A, the second color filter 314B, and the third color filter 314C during operations of the methods described herein.

The white light source 302D directs the white light through the first lens 306 and to the color filter tray 312. The color filter tray converts the white light into a filtered light such as the first light, the second light, or the third light described above. The light is directed to the reticle tray 308 to project the pattern corresponding to the reticles 322, as described above with reference to the first configuration 300A. The pattern is directed to the second lens 310. The second lens 310 converts the pattern such that the first grating 104*a* can receive the pattern. The pattern projected from the reticles 322 undergoes TIR until it is outcoupled from the third grating 104*c*. The third grating 104*c* corresponds to an output coupling grating.

Figure 3C:
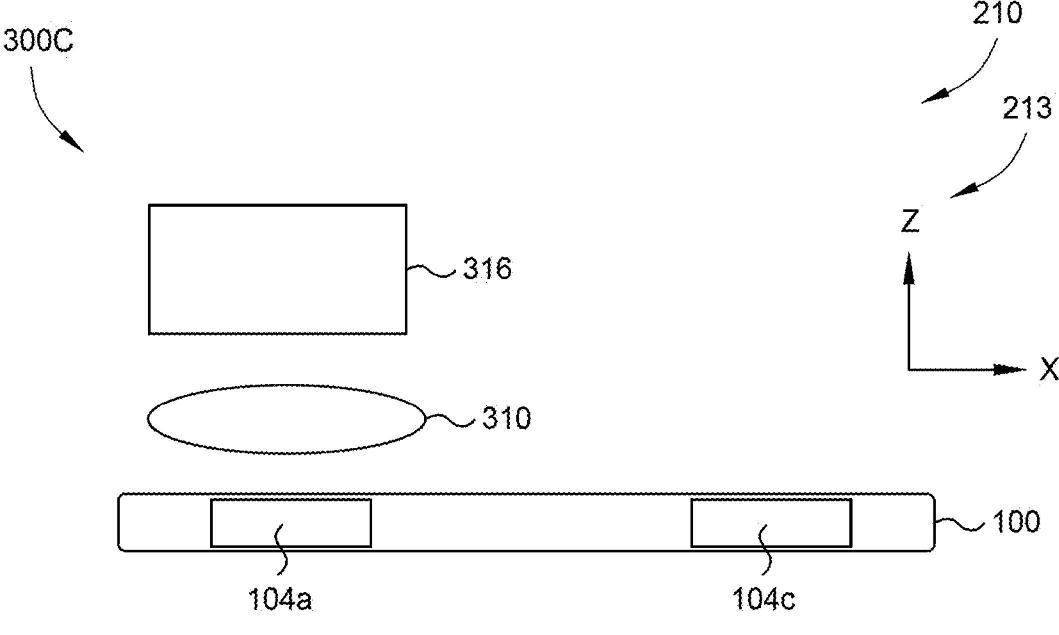

FIG. 3C is a schematic view of a third configuration 300C of a light engine 210 of a measurement system 200 according to embodiments described herein. The third configuration 300C includes a display module 316 and the second lens 310. The display module 316 and the second lens 310 are disposed in the light engine body 213. The display module 316 includes a micro LED module, a liquid crystal on silicon (LCOS) module, digital light processing (DLP) module, or laser projection module. The display module 316 is operable to project a pattern to the first grating 104*a* of the optical device 100. The display module 316 is operable to project multiple different patterns to the first grating 104*a*. Each pattern projected by the display module 316 may correspond to a different metrology metric to be determined by the measurement system 200. Each pattern may correspond to red, green, and blue channels. The second lens 310 converts the pattern such that the first grating 104*a* can receive the pattern. Each pattern projected from the display module 316 undergoes TIR until it is outcoupled from the third grating 104*c*. The third grating 104*c* corresponds to an output coupling grating.

Figure 3D:
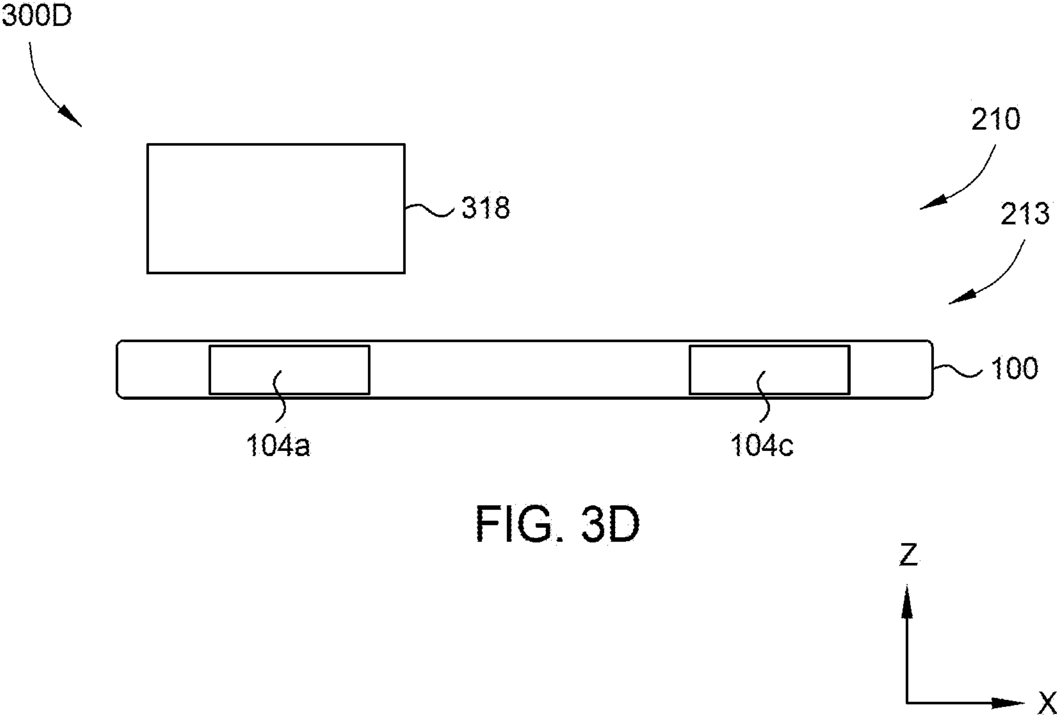

FIG. 3D is a schematic view of a fourth configuration 300D of a light engine 210 of a measurement system 200 according to embodiments described herein. The fourth configuration 300D includes a laser module 318 disposed in the light engine body 213. The laser module 318 may be one of a laser projection module or laser scanning module. The laser module 318 is operable to project a pattern to the first grating 104*a* of the optical device 100. The laser module 318 is operable to project multiple different patterns to the first grating 104*a*. Each pattern projected by the laser module 318 may correspond to a different metrology metric to be determined by the measurement system 200. Each pattern may correspond to red, green, and blue channels. The pattern may be projected to a single pixel of the first grating 104*a*. The laser module 318 is scanned over the first grating 104*a* such that the pattern is projected to multiple pixels of the first grating 104*a*. Each pattern projected from the laser module 318 undergoes TIR until it is outcoupled from the third grating 104*c*. The third grating 104*c* corresponds to an output coupling grating.

Figure 3E:
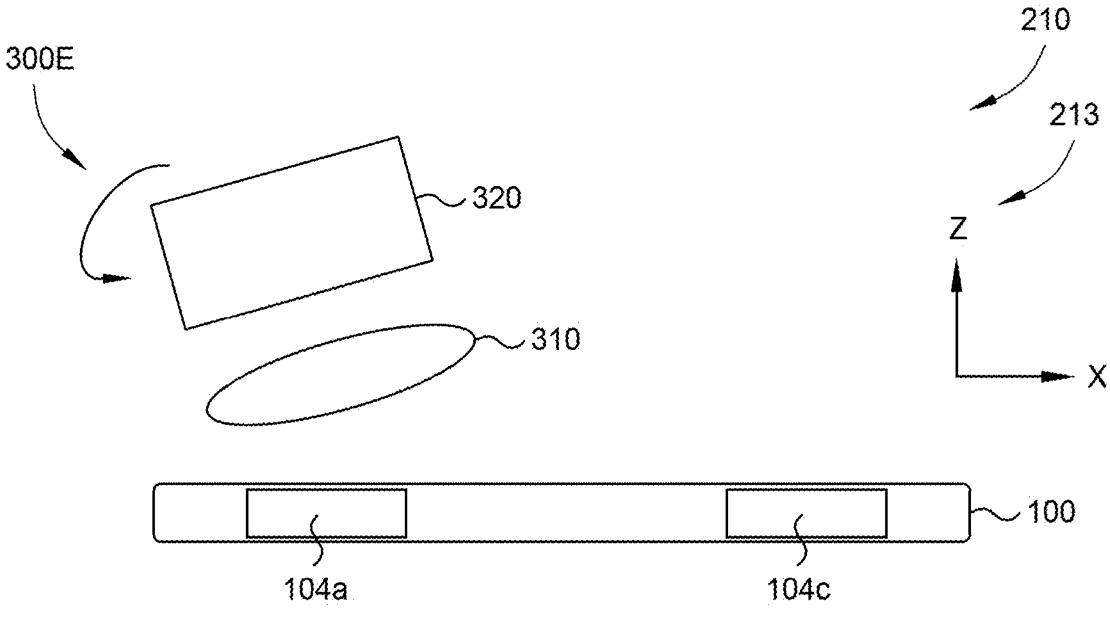

FIG. 3E is a schematic view of a fifth configuration 300E of a light engine 210 of a measurement system 200 according to embodiments described herein. The fifth configuration 300E includes a module 320 and the second lens 310. The module 320 and the second lens 310 are disposed in the light engine body 213. In one embodiment, which can be combined with other embodiments described herein, the module 320 may be the display module 316. In another embodiment, which can be combined with other embodiments described herein, the module 320 may include a light source (i.e., the first light source 302A, the second light source 302B, the third light source 302C, or the white light source 302D with the color filter tray 312) and the reticles 322 on the reticle tray 308. The module 320 is operable to be rotated and/or tilted. The rotation of the module 320 allows for an incidence angle of the light projected from the module 320 to be adjusted. For example, the module 320 is rotated and/or tilted with rotation stages. The module 320 is operable to project multiple different patterns to the first grating 104*a*. Each pattern projected by the module 320 may correspond to a different metrology metric to be determined by the measurement system 200. Each pattern may correspond to red, green, and blue channels. The second lens 310 converts the pattern such that the first grating 104*a* can receive the pattern. By rotating and/or tilting the module 320, ghost imaging may be reduced. Ghost imaging may be reduced due to the reflection of the pattern projected to the first grating 104*a* not being reflected directly back to the module 320 and the second lens 310. Additionally, the rotation and/or tilting the module 320 will provide for the extension of the field of view for the measurement system 200. For example, the rotation and/or the tilting of the module 320 provides a field of view between about 10 degrees and about 120 degrees.

The configurations 300A-300E of the light engine 210 are all operable to be utilized in the measurement system 200. The configurations 300A-300E of the light engine 210 to be used in the measurement system 200 are determined by the design of the optical device 100. Further, the configuration 300A-300E can be chosen based upon the intended use of the optical device 100 to be measured by the measurement system 200. For example, the field of view of the configuration 300A-300E should be matched to the field of view that will be used with the optical device 100. The configurations 300A-300E are designed for measurement systems 200 with a field of view between about 10 degrees and about 120 degrees.

Figure 4:
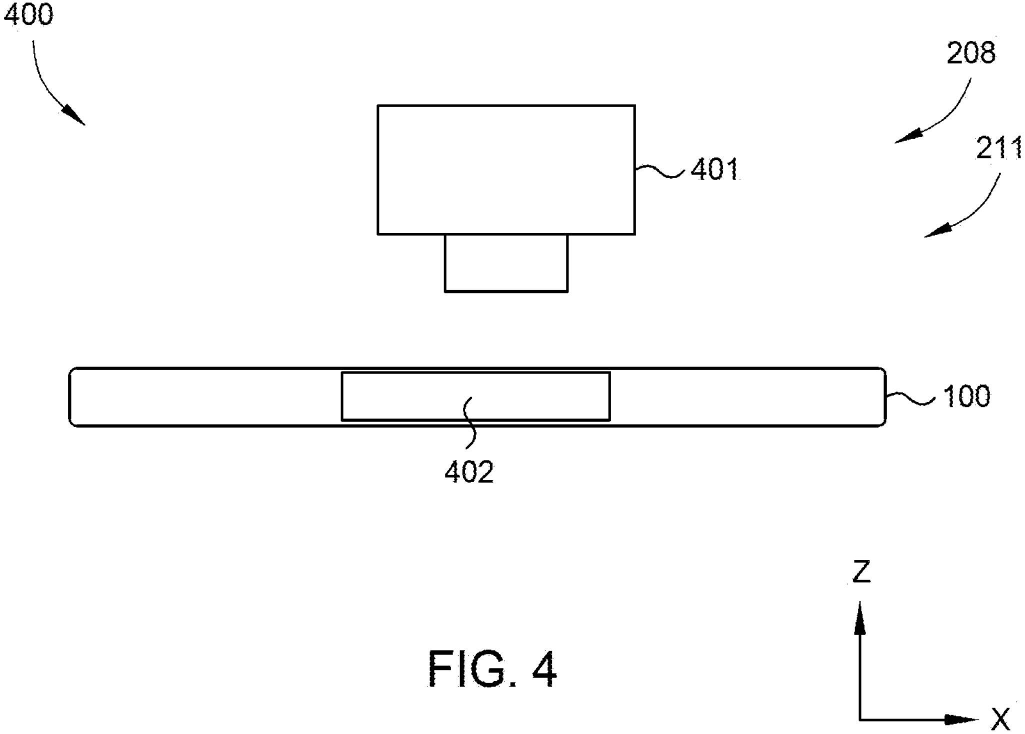
FIG. 4 is a schematic view of a configuration of an alignment camera of a measurement system according to embodiments described herein.

FIG. 4 is a schematic view of a configuration 400 of an alignment camera 208 of a measurement system 200 according to embodiments described herein. The alignment camera 208 includes one or more cameras 401 disposed therein. The one or more cameras 401 capture one or more images of one or more alignment markers 407 on the optical device 100. The one or more images are processed in the controller 220 to determine the location and orientation of the optical device 100. A scanning path for the measurement system 200 may be generated along the optical device 100 based on the one or more images of the alignment markers 407. The scanning path is operable to correct for misalignment of the optical device 100. The alignment camera 208 is operable to correct any misalignment of the optical device 100 relative to the light engine 210 and the reflection detector 212. The misalignment correction via the one or more alignment markers 407 allow the light engine 210 to accurately project the pattern to the first grating 104*a*. For example, the alignment marker 407 provides for a field of view to align with the first grating 104*a*. Therefore, having the field of view aligned with and substantially equal to a width of the first grating 104*a* improves the overall efficiency of the measurement system 200 by efficiently incoupling the light to the first grating 104*a*.

Figure 5:
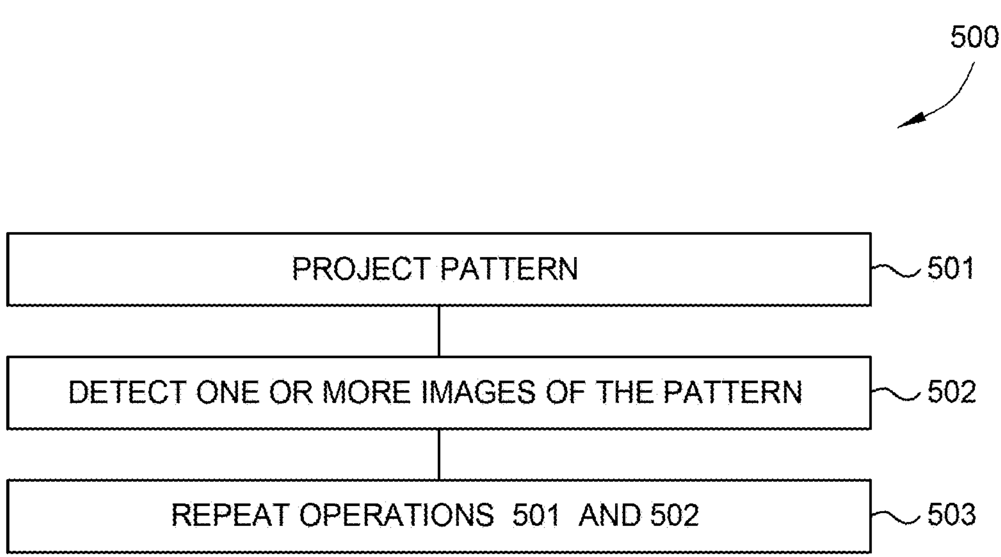
FIG. 5 is a flow diagram of a method of optical device metrology according to embodiments described herein.

FIG. 5 is flow diagram of a method 500 of optical device metrology according to embodiments described herein. The method 500 may be utilized to project a pattern to a first grating 104*a* of an optical device 100. The method 500 may be utilized with any of the configurations 300A-300E of the light engine 210. In one embodiment, which can be combined with other embodiments described herein, the light engine 210 is operable to be disposed on a rotation stage such that the light engine 210 may be rotated and/or tilted as desired during the method 500.

At operation 501, a pattern is projected. The pattern is projected via a light engine 210. As shown in the first configuration 300A, a light may be projected by a first light source 302A. The light may be directed to a first lens 306 from the first light source 302A to collimate the light. As shown in the second configuration 300B, the light may be projected from a white light source 302D passing through a first color filter 314A of a color filter tray 312. The light may be directed to a first lens 306 from the white light source 302D to collimate the light. As shown in the third configuration 300C, the light may be projected by the display module 316. As shown in the fourth configuration 300D, the light may be projected by the laser module 318. As shown in the fifth configuration 300E, the light may be projected by the module 320. The light corresponds to a wavelength or a range of wavelengths.

In some embodiments, which can be combined with other embodiments described herein, as shown in the first configuration 300A and the second configuration 300B, a reticle tray 308 is positioned such that the light is projected to the reticle tray 308. The reticle tray 308 is positioned such that one of a first reticle 322A, a second reticle 322B, or a third reticle 322C of a plurality of reticles 322 disposed on the reticle tray 308 may receive the light from the first lens 306. The reticle 322 is chosen based on one or more metrology metrics to be determined. The pattern corresponding to one of the first reticle 322A, the second reticle 322B, or the third reticle 322C is projected to a first grating 104*a* of an optical device 100. The designed pattern may be directed to the first grating 104*a* through a second lens 310. The second lens 310 is an eyepiece lens. In other embodiments, which can be combined with other embodiments described herein, as shown in the third configuration 300C, the fourth configuration 300D, and the fifth configuration 300E, the pattern is produced by one of the display module 316, the laser module 318, or the module 320, respectively.

At operation 502, one or more images of the pattern are detected. The one or more images of the pattern are captured by a reflection detector 212. The pattern undergoes TIR until it is outcoupled (e.g., reflected or transmitted) and captured by the reflection detector 212 as the one or more images. The one or more images are processed to extract the metrology metrics. The images are full-field images. The one or more images may be processed in a controller 220 (shown in FIG. 2). The controller 220 may be a remote controller 220 operable to receive the one or more images. The controller 220 may include a central processing unit (CPU) configured to process computer-executable instructions stored in memory. The computer-executable instructions may include algorithms configured to extract the metrology metrics. For example, the controller 220 is configured to perform embodiments of the method 500 described herein, such as processing the one or more images to determine values for the metrology metric corresponding to the respective pattern captured in the one or more images. One of skill in the art will appreciate that one or more elements of the controller 220 may be located remotely and accessed via a network.

At operation 503, the operation 501 and the operation 502 are repeated for subsequent patterns. Each of the subsequent patterns may be projected by the light corresponding to a wavelength or a range of wavelengths. For example, each pattern may be red, green, or blue channels. As shown in FIGS. 3A and 3B, the first configuration 300A and the second configuration 300B each include the reticle tray 308 such that each pattern of the subsequent patterns may correspond to a different reticle 322. As shown in FIGS. 3C-3E, the third configuration 300C, the fourth configuration 300D, and the fifth configuration 300E include the display module 316, the laser module 318, or the module 320, respectively, such that each pattern of the subsequent patterns may be produced by the display module 316, the laser module 318, or the module 320. In one embodiment, which can be combined with other embodiments described herein, each subsequent pattern is different from the preceding patterns. In another embodiment, which can be combined with other embodiments described herein, each subsequent pattern is the same as the preceding patterns.

In summation, light engines of a measurement system and methods of using the light engines are described herein. The measurement system includes a light engine operable to illuminate a first grating of an optical device. The light engine projects a pattern to the first grating such that a metrology metric may be extracted from one or more images captured by a detector of the measurement system. The metrology metrics determine if the optical device meets image quality standards. The light engine is operable to rotate and tilt such that ghost imaging may be reduced. Additionally, an alignment camera of the measurement system allows for misalignment correction in the measurement system.

While the foregoing is directed to embodiments of the present disclosure, other embodiments of the disclosure may be devised without departing from the basic scope thereof, and the scope thereof is determined by the claims that follow.

What is claimed is:

1. A measurement system, comprising:
- a stage operable to retain an optical device or an optical device substrate having at least one optical device disposed thereon;
- a light engine disposed above the stage, the light engine including:
  - one or more light sources operable to project a light to the optical device at a range of wavelengths;
  - a reticle tray disposed below the one or more light sources, the reticle tray having a plurality of reticles disposed thereon, each reticle of the plurality of reticles having a different pattern to be projected when the light is directed to each reticle of the plurality of reticles;
- an alignment camera adjacent to the light engine, the alignment camera positioned to capture one or more images of one or more alignment markers on the optical device or the optical device substrate; and
- a reflection detector adjacent to the light engine, the reflection detector positioned to detect outcoupled beams projected from the at least one optical device.

2. The measurement system of claim 1, wherein the light engine further includes a second lens operable to receive a pattern, the second lens operable to project the pattern to an input coupling grating of the optical device.

3. The measurement system of claim 1, wherein the patterns may each correspond to red, green, and blue channels.

4. The measurement system of claim 1, wherein is a micro LED module, a liquid crystal on silicon (LCOS) module, digital light processing (DLP) module, or laser projection module operable to project the one or more patterns.

5. The measurement system of claim 1, wherein a field of view of the light engine is between about 10 degrees and about 100 degrees.

6. The measurement system of claim 1, wherein the stage is transparent.

7. A measurement system, comprising:
- a stage operable to retain an optical device or an optical device substrate having at least one optical device disposed thereon; and
- a light engine disposed above the stage, the light engine including:
  - a plurality of light sources, the plurality of light sources operable to project a light to the optical device at a range of wavelengths;
  - a first lens operable to collimate the light from each of the plurality of light sources;
  - a reticle tray disposed below the plurality of light sources, the reticle tray having a plurality of reticles disposed thereon, each reticle of the plurality of reticles having a different pattern to be projected when the light is directed to each reticle of the plurality of reticles, each reticle pattern corresponding to a different metrology metric, the reticle tray movable such that each of the plurality of reticles is positionable below the first lens; and
  - a second lens disposed below the reticle tray, the second lens operable to receive the pattern projected from each of the plurality of reticles and operable to project the different pattern to an input coupling grating of the optical device.

8. The measurement system of claim 7, wherein the light engine is coupled to a rotation stage, the rotation stage operable to rotate or tilt the light engine.

9. The measurement system of claim 7, wherein the plurality of light sources includes a first light source operable to project a first range of wavelengths of 620 nm to 750 nm, a second light source operable to project a second range of wavelengths of 495 nm to 570 nm, and a third light source operable to project a third range of wavelengths of 450 nm to 495 nm.

10. The measurement system of claim 7, further comprising an alignment camera adjacent to the light engine, the alignment camera operable to capture one or more images of one or more alignment markers on the optical device or the optical device substrate.

11. The measurement system of claim 7, wherein the light engine includes a plurality of mirrors, the plurality of mirrors operable to direct the light from the plurality of light sources to the first lens.

12. The measurement system of claim 7, further comprising a reflection detector adjacent to the light engine, the reflection detector positioned to detect the different pattern projected from each of the plurality of reticles.

13. The measurement system of claim 7, further comprising a transmission detector positioned on an opposite side of the stage than the light engine, the transmission detector operable to detect the pattern projected from each of the plurality of reticles.

14. A method, comprising:

projecting a first pattern with a light from a light engine, the light engine having a light source that projects the light at a range of wavelengths to a first reticle of a reticle tray disposed below the light source, the reticle tray having the first pattern that is projected to an optical device, the light engine disposed in a measurement system, the measurement system having:

a stage disposed under the light engine;

a tray disposed on the stage, the tray having the optical device or an optical device substrate having the optical device disposed thereon, the optical device receives the first pattern; and a reflection detector oriented toward the stage;

detecting one or more images of the first pattern, the image detected when the pattern undergoing total internal reflection through the optical device is outcoupled to the reflection detector;

processing the image to extract a first metrology metric;

projecting a second pattern by projecting light from the light source to a second reticle having the second pattern different than the first pattern to the optical device;

detecting one or more images of the second pattern; and processing the image to extract a second metrology metric.

15. The method of claim 14, wherein a light width of the light is substantially equal to a width of an input coupling grating of the optical device.

16. The method of claim 14, further comprising rotating or tilting the light engine when projecting the light.

17. The method of claim 14, further comprising utilizing an alignment camera of the measurement system to correct misalignments of the optical device relative to the light engine.

18. The method of claim 14, wherein the first metric and the second metrology metric include one or more of an angular uniformity metric, a contrast metric, a efficiency metric, a color uniformity metric, a modulation transfer function (MTF) metric, a field of view (FOV) metric, a ghost image metric, an eye box metric.

19. The method of claim 14, further comprising repeating the method for subsequent patterns.

* * * * *